(No Model.)
A. C. MATHER.
ELECTRICAL TROLLEY FOR CANAL BOATS.
No. 540,325. Patented June 4, 1895.
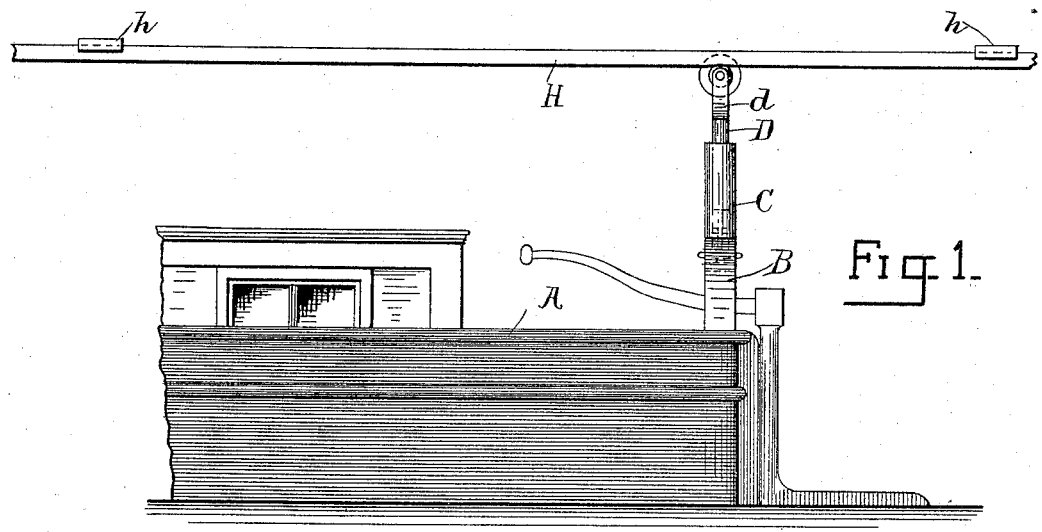
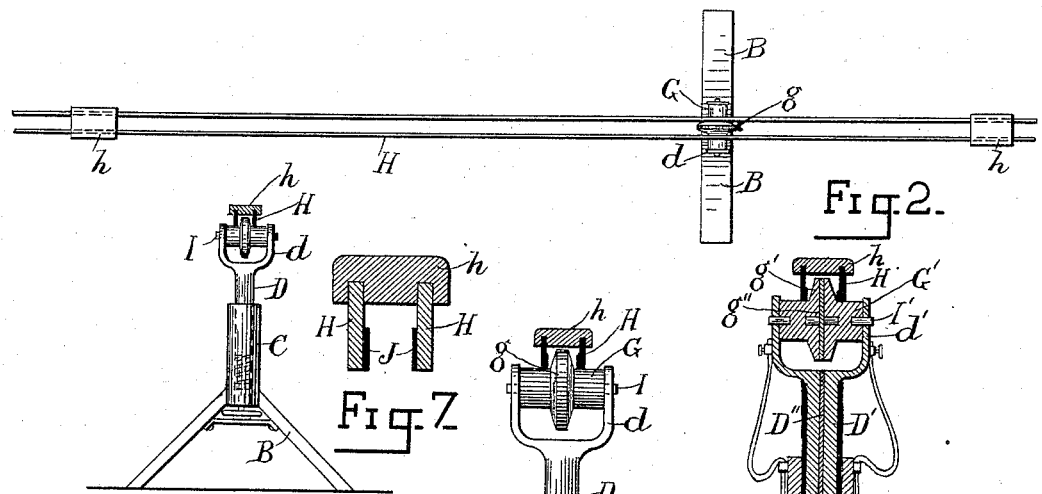
WITNESSES:
A. N. Dobson
J. J. McCarthy
INVENTOR:
Alonzo C. Mather

UNITED STATES PATENT OFFICE.

ALONZO C. MATHER, OF CHICAGO, ILLINOIS.

ELECTRICAL TROLLEY FOR CANAL-BOATS.

SPECIFICATION forming part of Letters Patent No. 540,325, dated June 4, 1895.

Application filed December 1, 1893. Renewed May 3, 1895. Serial No. 548,057. (No model.)

*To all whom it may concern:*

Be it known that I, ALONZO C. MATHER, a citizen of the United States, residing at Chicago, in the county of Cook and State of Illinois, have invented certain new and useful Improvements in Electric Trolleys, of which the following is a specification.

My invention relates more particularly to electric trolleys as used on canal boats, and the description in the following specification relates particularly to that, although the trolley may be used on cars and other contrivances as well.

The object of my invention is to provide a trolley which will hold close to a double wire or conductor, and yet so constructed that it will act as a guide in connection with the double conductor wire or plates—plates being used in the illustrations of the drawings but wires may be used as well.

In the drawings, Figure 1 represents an elevation of the stern of the boat with trolley attachment and the conductor-plates. Fig. 2 is a plan of the plates and trolley. Fig. 3 is an end view of the same. Fig. 4 is an enlarged section of the trolley post, wheel, &c. Fig. 5 represents a modification of my trolley-wheel for a return circuit, and Fig. 6 is an enlarged section of said modified wheel. Fig. 7 is a section of the conducting-plates, showing the insulated separated pieces and the special copper conductors.

Similar letters refer to like parts in the various views of the drawings.

In the drawings, A, represents the stern of a canal boat.

B, represents the bracing pieces which hold the upright piece, C.

C, is the holder of the trolley spindle D, the former being hollowed out so that the spindle slides up and down in it. Within the piece, C, is the spring F, on the top of which the trolley spindle D, rests, while at the bottom of said spring there is the nut, e, which is moved up and down by means of the screw, f, which is turned by the wheel, E, said wheel resting on the cross piece, b, which is fastened to the braces, B. By this means the trolley spindle, D, may be moved either up or down by turning the wheel E, and yet said spindle will have an up and down play and be held firmly against the conductors by the spring.

d, represents the two jaws which hold the wheel (trolley wheel).

G, is the main part of the trolley wheel which travels on the conductors, and g, is an enlarged portion which extends up between the two wires or plates, H, and thus prevents a side movement of the trolley.

I, I, are two small pins passing through the jaws, d, upon which the trolley wheel revolves.

h, represents stay pieces which hold the two plates H, apart and are made of an insulating material and placed at short intervals along the line, thus holding the plates entirely apart and giving them the requisite amount of rigidity to guide the boat on its course.

The plates, H, may be made of iron and upon the lower inside portion of each plate may be placed a piece of copper, J, which will act as the conductor.

Figs. 5 and 6 represent a modified form of my trolley, this form being designed to have one of the conducting wires or plates for a return circuit. In this form the halves of the trolley wheel G, are separated by the insulating piece g'' (see Fig. 6), said insulating piece having projecting from it two small pins g''' which project into the wheel and hold it together, as is clearly shown in Fig. 6. In the end of this modified form is placed the pins I', which pass through the jaw piece d', and enable the wheel to revolve. The parts of the spindle D', and the jaws d', are separated by the insulating piece D''. By the means shown, the two parts of the trolley are insulated entirely from one another, and thus the positive circuit may be sent along one part of the double plates, H, down one half of the trolley with its attachments to the motor and returned through the other half; thus making a return circuit by wire or plates on the guide.

In the use of this trolley with the canal boat, one may be placed in the bow or one in both bow and stern and act as guides for the boat as well as conductors for the circuit. The piece, g, extending up between the plates H H, holds the boat to her course in such a manner that she follows the direction of the plates.

Having thus described my invention, what I claim as new, and desire to secure by Letters Patent, is—

1. The combination, with a canal boat, of a set of double trolley wires or plates: a trolley which rolls upon said wires or plates and has an enlarged portion which extends up between said wires or plates and prevents a lateral movement of said trolley: a spindle with jaws for holding said trolley wheel: a casing inclosing said spindle, which casing is attached firmly to the canal boat and allows a vertical movement of said trolley while a lateral movement is prevented, and within said casing, a spring so arranged that it may be adjusted in relation to said spindle all substantially as and for the purpose set forth.

2. The combination, with a canal boat, of a trolley wheel having a raised central portion: a spindle having jaws for the support of said trolley wheel: a casing inclosing said spindle, said casing being so attached to the canal boat that the spindle has a vertical movement only and within said casing a spring so arranged that it may be adjusted in relation to the spindle, all substantially as and for the use set forth.

3. A trolley composed of the trolley wheel "G:" the raised portion "$g$," centrally located on said trolley wheel: the pins "I." upon which said wheel rotates: the jaws "$d$" and the spindle "D" for holding said wheel: the casing "C" into which said spindle movably fits: the spring "F" and a screw for regulating the height of said spring in the casing "C," all substantially as set forth and described.

4. Two overhead parallel trolley wires or plates, braced and insulated in such a manner that they may be combined with a trolley having a raised central portion and which is attached to a canal boat so as to have a vertical movement only, and thus act as a guide for said canal boat, all substantially as is set forth.

ALONZO C. MATHER.

Witnesses:
J. J. McCarthy,
A. E. T. Hansmann.